May 4, 1937. W. R. BRIDGENS 2,079,149
LIFTING JACK AND JACKING SYSTEM FOR VEHICLES
Filed Oct. 18, 1935 2 Sheets-Sheet 2
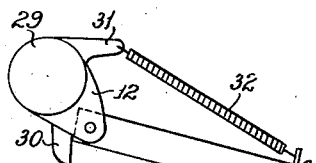
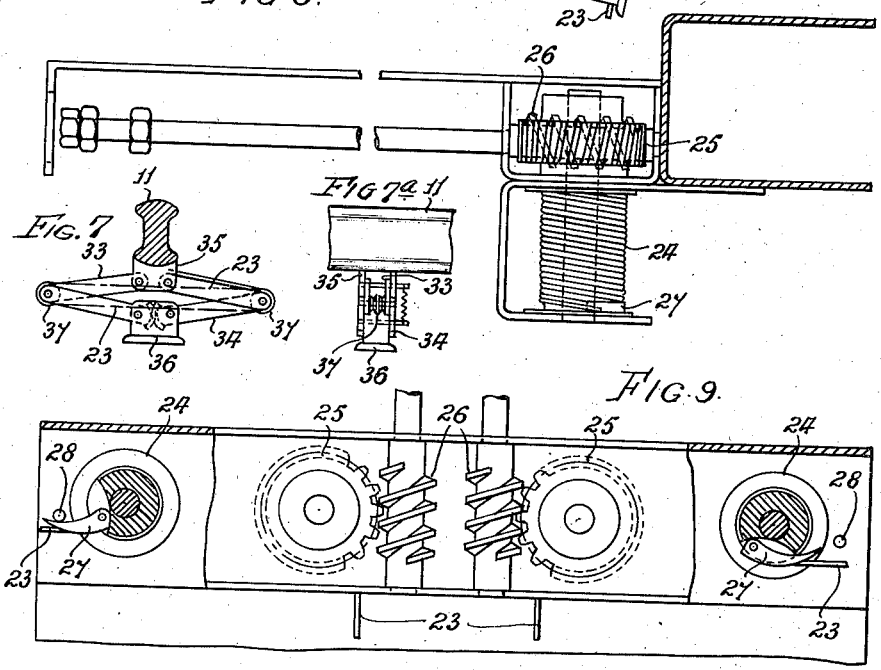
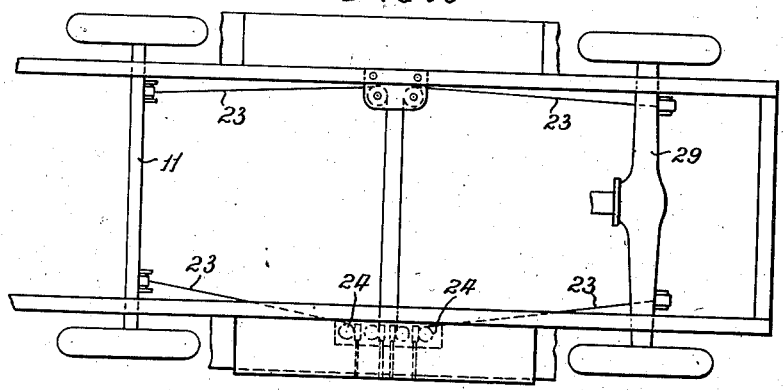
INVENTOR:
WALTER ROY BRIDGENS
BY Francis E. Boyce
ATTORNEY Patented May 4, 1937

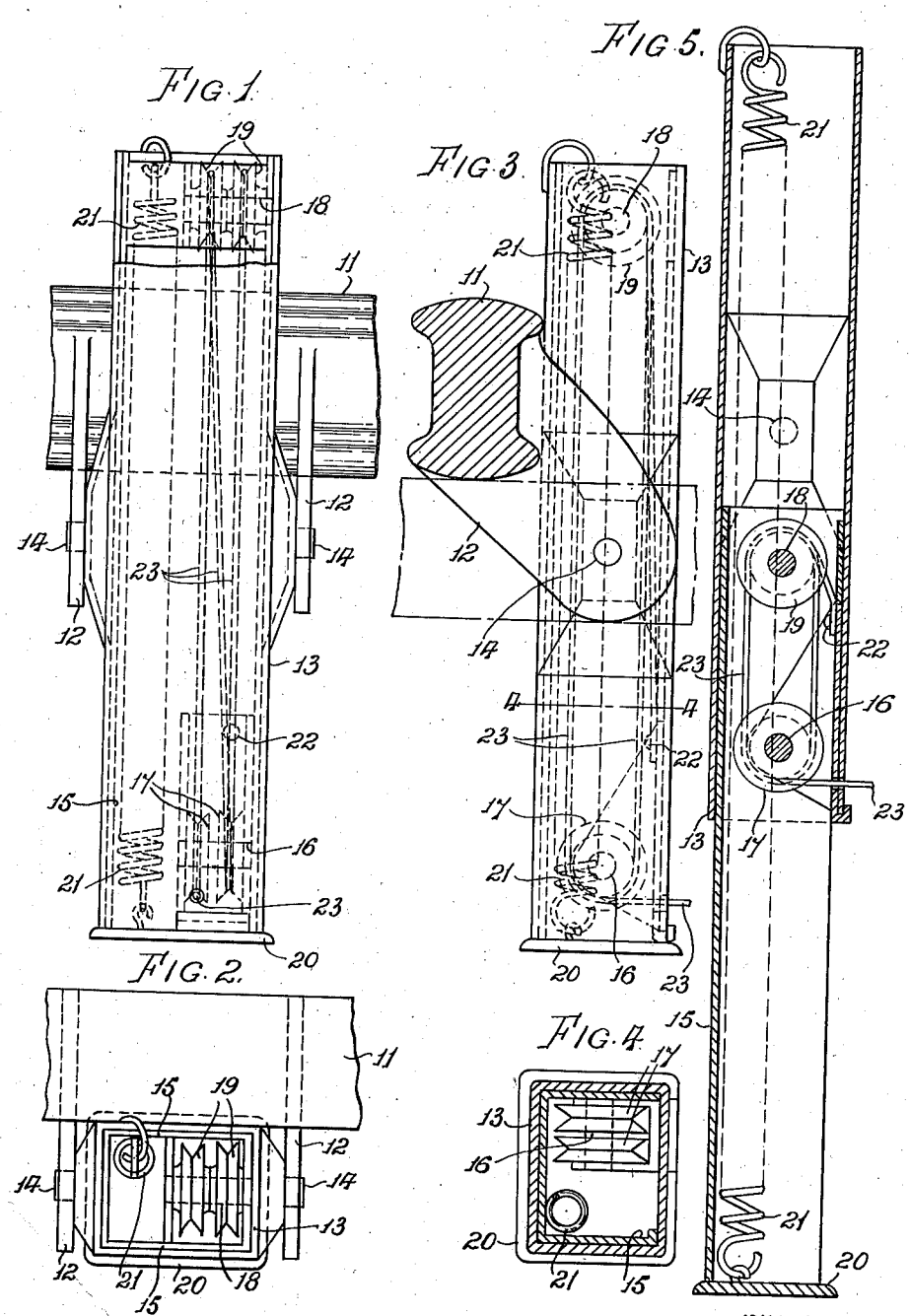

2,079,149

UNITED STATES PATENT OFFICE 2,079,149

LIFTING JACK AND JACKING SYSTEM FOR VEHICLES

Walter Roy Bridgens, Northenden, Manchester, England

Application October 18, 1935, Serial No. 45,573
In Great Britain October 20, 1934

5 Claims. (Cl. 254—86)

This invention has reference to lifting jacks and jacking systems for vehicles of the kind which are permanently mounted on the vehicle, and are brought into use as and when required.

Jacks and jacking systems of the general kind referred to are well known, some jacks being operated individually others being operated altogether from a central point, and some being capable of use in both ways as desired. Some such jacks have been mechanical and others have been hydraulic or pneumatic but for various reasons none have come into general use probably because they are expensive to make and fit and by the nature of their construction they add a considerable dead weight to the car axles.

The present invention has for its object to provide improvements in jacks and jacking systems of the mechanical kind which will largely overcome the difficulties and disadvantages enumerated above and will provide light strong jacks which can easily be operated and can be fixed in position in new or existing vehicles.

According to this invention lifting jacks for vehicles of the kind permanently mounted on the vehicle comprise telescopic or collapsible members provided with a system of pulleys or their equivalent around which passes a wire or the like in such a manner that when the wire is pulled in one direction the pulley system will close up and extend the telescopic or collapsing members.

The invention is more particularly set forth with reference to the accompanying drawings wherein—

Fig. 1 is a part sectional elevation of a jack looking toward the front axle;

Fig. 2 is a plan;

Fig. 3 is a side elevation;

Fig. 4 is a section on the line 4—4 of Fig. 3;

Fig. 5 is a sectional side elevation showing the jack extended;

Fig. 6 shows a side elevation of an application of the invention to a rear axle;

Fig. 7 is a side elevation of a modified form of jack embodying the invention, the axle of the vehicle being shown in cross-section;

Fig. 7a is a view taken at right angles to Fig. 7;

Fig. 8 is an end elevation of a suitable winding gear;

Fig. 9 is a plan turned at right angles to Fig. 8 and

Fig. 10 is a diagram in plan of a car chassis showing the scheme of mounting.

The individual jacks are mounted on the axles or other convenient part of the vehicle, one being near to each wheel and in the drawings they are shown as mounted on the axles. The operation of all the jacks as identical and the construction of all jacks forming a set is the same so that it is only necessary to describe and illustrate individual jacks.

Referring first to Figs. 1, 2, 3, 4, and 5 which show one form of jack mounted on the front axle of a vehicle, the axle being indicated at 11 having lugs 12 which may be of any desired suitable shape or construction and which serve solely as supports and mounts for the jacks. The jacks as shown in Figs. 1 to 6 are of telescopic construction and comprise two telescopic square tubes, one tube 13 being mounted by pivots 14 in the lugs 12 so that it can be turned from its normal horizontal inoperative position as shown in Figure 6, to its vertical operative position as shown in Figs. 1, 2, 3, 4 and 5.

The tube 15 is mounted slidably within the tube 13 and the two are of such a size that an easy sliding movement is possible without any undue lateral movement. The tube 15 is however open down one side and is thus more in the nature of a channel member than a tube.

At the lower end of the large tube 13 are lugs which project into the channel of the smaller tube 15 in which lugs a shaft or a rod 16 is mounted carrying pulleys 17, two of such pulleys being shown in the drawings, and mounted on a shaft or a rod 18 at the top of the smaller and inside tube 15 are two similar pulleys 19.

The bottom of the smaller and inside tube 15 has a foot 20 to the inside of which one end of a spring 21 is anchored, the other end being connected to the top of the larger outside tube 13.

Secured to the lower end of the outside larger tube 13 at 22 is one end of a cable 23 which passes upward and over one of the pulleys 19 at the top of the inside tube 15, thence down and under one of the pulleys 17 at the bottom of the larger outside tube thence up and over the other pulley 19 and finally under the second pulley 17 and thence out through an opening in the side of the larger tube 13 near the bottom.

Normally the spring 21 is partially collapsed and the two tubes are in the positions shown in Figs. 1 and 3 with the two sets of pulleys at their maximum distance apart and the whole device lies horizontally, preferably below, or above the axle.

When the cable 23 is pulled, the jack is turned on its pivots 14 into the vertical position in abutting relation with the axle 11, as shown in Figure 3, and any further pull draws the two sets of pulleys nearer to each other thus forcing the free and smaller tube 15 downwardly and as the foot thereof reaches the ground any further pull will lift the part connected to and mounted on the vehicle thus raising the vehicle.

It will be appreciated that by means of this arrangement of pulleys a small force will lift a large load and the power ratio can be increased by increasing the number of pulleys. In order however to provide an efficient lift with a still smaller power and without increasing the number of pulleys an arrangement such as shown in Figs. 8 and 9 is used. In this device the cable 23 from each jack is connected to a drum 24 on a spindle with a worm gear wheel 25 on the top of it engaging a worm 26 on one end of a shaft which has its other end shaped to fit an operating handle, which may conveniently be the wheel brace or wrench. Thus when the worm carrying shaft is turned the cable is wound either on or off according to the direction of movement and the jack is either pulled into operation or allowed to collapse and turn into its normal inoperative position, a spring connection between the lower end of the jack and its mounting being used for this latter purpose, as shown at 32 in Figure 6.

In order to prevent the continued rotation of the operating handle after the collapse and rise of the jack and which movement if continued would again pull it down, the cable 23 is connected to the drum 24 through a pivoted catch 27 which normally lies in a recess in the drum as shown in Fig. 9 at the right hand end, but which is pulled out as shown at the left hand end of Fig. 9 to engage a stop 28, which prevents further rotation, if the operating handle be turned after the cable is fully unwound and when the jack has been raised to its normal inoperative position.

As shown in Fig. 10 the cable 23 from the various jacks are for the sake of convenience all brought to one position so that all the jacks can be operated from one point without the need for the person using to walk round the vehicle.

Fig. 6 shows a method of mounting a jack on a rear axle 29 which has lugs 12 and a stop 30, the jack in this arrangement being pivoted at 14 at the top of the outside member 13 instead of near the middle thereof as when mounted on a front axle. In addition to the lugs 12 and the stop 30 which prevents the jack from being pulled down beyond the vertical position is a lug 31 to which one end of a returning spring 32 is connected for pulling the jack into the normal "up" position and for holding it there when not in use. The opposite end of the spring 32 is fixed to the member 13 in opposed relation to the opening therein for the cable 23.

Fig. 7 shows two elevations at right angles of an alternative construction in which the principle already described is used for operating non-telescopic but collapsible members.

In this arrangement the jack is composed of top and bottom pivoted links 33 and 34 respectively, the top links being pivoted on mountings 35 on the axle and the bottom links having geared ends and supporting a foot 36 for engaging the ground.

The pivots uniting the links 33 and 34 have pulleys 37 upon them around which a cable 23 is wound as already described and when the cable is pulled the pulleys are drawn together thus forcing the links 33 and 34 downward vertically owing to the equal movement of both the bottom links by virtue of the geared ends, and raising the axle when the foot 36 engages the ground.

It is to be understood that while in this description pulleys have been referred to as the supports for the cable within the jack, it is not necessary that pulleys should be used though they will probably be most suitable; instead of pulleys hard rods which may be suitably grooved may be used and these need only be curved on one side so that the cable can slide on them. When rods are so used the principle of operation of the jacks is exactly as described but there will probably be a little more friction between the cable and the rods than between the cable and the pulleys.

What I claim as my invention and desire to secure by Letters Patent is:—

1. An improved lifting jack for vehicles comprising a hollow member pivotally mounted on said vehicle, a secondary member slidable within the pivoted member, pulleys mounted on said members, a spring holding said pivoted member normally in horizontal position relative to the vehicle, a second spring holding said sliding member normally within said pivoted member, a flexible tension member engaged around said pulleys, whereby said pivoted member and said sliding member can be actuated into vertical position and the sliding member extended from the pivoted member against the tension of said springs.

2. An improved lifting jack for vehicles comprising a hollow member pivotally mounted on said vehicle, a secondary member slidable within said pivoted member, pulleys mounted in said members, a spring holding said pivoted member normally in horizontal position relative to the vehicle, a second spring holding said sliding member normally within said pivoted member, a flexible tension member engaged around said pulleys, whereby said pivoted member and said sliding member can be actuated into the vertical position relative to the vehicle and the sliding member extended from the pivoted member against the tension of said springs, and a stop on said vehicle in the path of movement of said pivoted member from its horizontal position to its vertical position to ensure the extending of the sliding member from the pivoted member by a further force exerted on the flexible tension member.

3. An improved lifting jack for vehicles comprising a member pivotally mounted on the vehicle at one end, a member slidably mounted in said pivotally mounted member to have movement into and out of the free end of said pivotally mounted member, a flexible tension member entering said pivotally mounted member at the free end thereof, pulleys mounted adjacent the free end of the pivotally mounted member, and pulleys mounted adjacent the inner end of said sliding member, said flexible tension member being engaged around said pulleys and secured at its inner end to the pivotally mounted member, whereby force applied to said flexible tension member will actuate the pulleys toward each other and the sliding member outwardly from the pivotally mounted member.

4. An improved lifting jack for vehicles comprising a member pivotally mounted on the vehicle, a spring for holding said member normally horizontal relative to the vehicle, pulleys mounted in one end of said member, a member slidably mounted in said pivoted member to have movement into and out of the end of the pivoted member arranged with the pulleys, pulleys mounted in the top of the sliding member in alinement with the pulleys in the pivoted member, a second spring anchored at the opposite ends to the pivoted and sliding members to normally hold the sliding member within the pivoted member, and a flexible tension member entering said pivoted member adjacent to the pulleys therein engaged about the pulleys of the pivoted and sliding members and anchored to the pivoted member, whereby when force is applied to the free end of the flexible tension member the pivoted member will be actuated to a vertical position against the tension of the first spring and the sliding member will be extended from the pivoted member against the tension of the second spring, and both springs returning both members to their normal positions when the force on the flexible member is released.

5. An improved lifting jack for vehicles comprising a hollow member pivotally mounted on the vehicle, a secondary member slidably mounted in the pivotal member, pulleys mounted in said members, a spring attached to the pivoted member and the vehicle to hold said pivoted member normally in horizontal position relative to the vehicle, a second spring attached to the pivoted and sliding members to hold the sliding member normally within the pivoted member, a flexible member having one end attached to the pivoted member and engaged around the pulleys, a drum rotatably mounted on the vehicle and having the free end of the flexible member attached thereto, and means operatively connected to the drum and arranged to permit actuation of the drum exteriorly of the vehicle and exert a force on the flexible member to actuate the pivoted and sliding members from horizontal to vertical positions and extend the sliding member from the pivoted member against the tension of the springs.

WALTER ROY BRIDGENS.